US010909119B2

(12) United States Patent
Liu et al.

(10) Patent No.: US 10,909,119 B2
(45) Date of Patent: Feb. 2, 2021

(54) ACCESSING ELECTRONIC DATABASES

(71) Applicant: Hewlett Packard Enterprise Development LP, Houston, TX (US)

(72) Inventors: Rui Liu, Sunnyvale, CA (US); Qiming Chen, Sunnyvale, CA (US); Meichun Hsu, Sunnyvale, CA (US); Jeffrey LeFevre, Sunnyvale, CA (US); Maria Castellanos, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 701 days.

(21) Appl. No.: 15/202,636

(22) Filed: Jul. 6, 2016

(65) Prior Publication Data

US 2018/0011905 A1   Jan. 11, 2018

(51) Int. Cl.
  *G06F 16/24*      (2019.01)
  *G06F 16/2455*    (2019.01)
  *G06F 16/21*      (2019.01)
  *G06F 16/242*     (2019.01)

(52) U.S. Cl.
  CPC ........ *G06F 16/24554* (2019.01); *G06F 16/21* (2019.01); *G06F 16/2433* (2019.01)

(58) Field of Classification Search
  CPC .............................. G06F 16/24554
  USPC ....................................... 707/718
  See application file for complete search history.

(56) References Cited

U.S. PATENT DOCUMENTS

| | | | |
|---|---|---|---|
| 8,671,091 B2* | 3/2014 | Cherniack | G06F 16/24544 707/714 |
| 9,043,368 B2 | 5/2015 | Mukhin et al. | |
| 9,336,270 B2 | 5/2016 | Xu et al. | |
| 10,031,935 B1* | 7/2018 | Cole | G06F 16/2315 |
| 2008/0033914 A1* | 2/2008 | Cherniack | G06F 16/283 |
| 2013/0262520 A1 | 10/2013 | Mukhin et al. | |
| 2016/0103931 A1* | 4/2016 | Appavu | G06F 16/24526 707/760 |
| 2017/0031988 A1* | 2/2017 | Sun | G06F 16/24554 |
| 2017/0193054 A1* | 7/2017 | Tang | G06F 16/2458 |

OTHER PUBLICATIONS

Prasad, et al., "Large-scale Predictive Analytics in Vertica: Fast Data Transfer, Distributed Model Creation and In-database Prediction", SIGMOD '15 Proceedings of the 2015 ACM SIGMOD International Conference on Management of Data, 2015, pp. 1657-1668.

(Continued)

*Primary Examiner* — Syling Yen

(57) ABSTRACT

Examples disclosed herein relate to accessing electronic databases. Some examples disclosed herein may include partitioning a computation task into subtasks. A processing node of a computation engine may generate a database query for retrieving an electronic data segment associated with at least one of the subtasks from a database. The database query may include pre-processing instructions for a database management system (DBMS) associated with the database to pre-process the electronic data segment before providing the electronic data segment to the processing node. The pre-processing instructions may include at least one of: filtering, projection, join, aggregation, count, and user-defined instructions. The generated query may be provided to the DBMS.

20 Claims, 3 Drawing Sheets

(56) References Cited

OTHER PUBLICATIONS

Spitzer, "Cassandra and Spark: Optimizing for Data Locality", Software Enginer @ DataStax, Jun. 24, 2015, 41 pages. <https://www.slideshare.net/SparkSummit/cassandra-and-spark-optimizing-russell-spitzer-1>.

Unknown, "Hadoop Integration Guide", HP Vertica Analytic Database, Software Version: 7.1x, Jul. 21, 2016, 135 pages.

* cited by examiner

ACCESSING ELECTRONIC DATABASES

BACKGROUND

Database systems organize and store electronic data. The electronic data may be stored in various storage schemas such as tables, trees, objects, reports, views, etc. Database management systems (DBMS) may manage database systems by, for example, creating database systems, maintaining (e.g., updating and repairing) the database systems, providing access to the electronic data stored thereon, and writing electronic data to the database systems.

Database systems may interact with other systems and users. For example, database systems may interact with computation engines that can perform various computations on the electronic data stored in the database systems.

BRIEF DESCRIPTION OF THE DRAWINGS

The following detailed description references the drawings, wherein.

DETAILED DESCRIPTION

Figure 1:
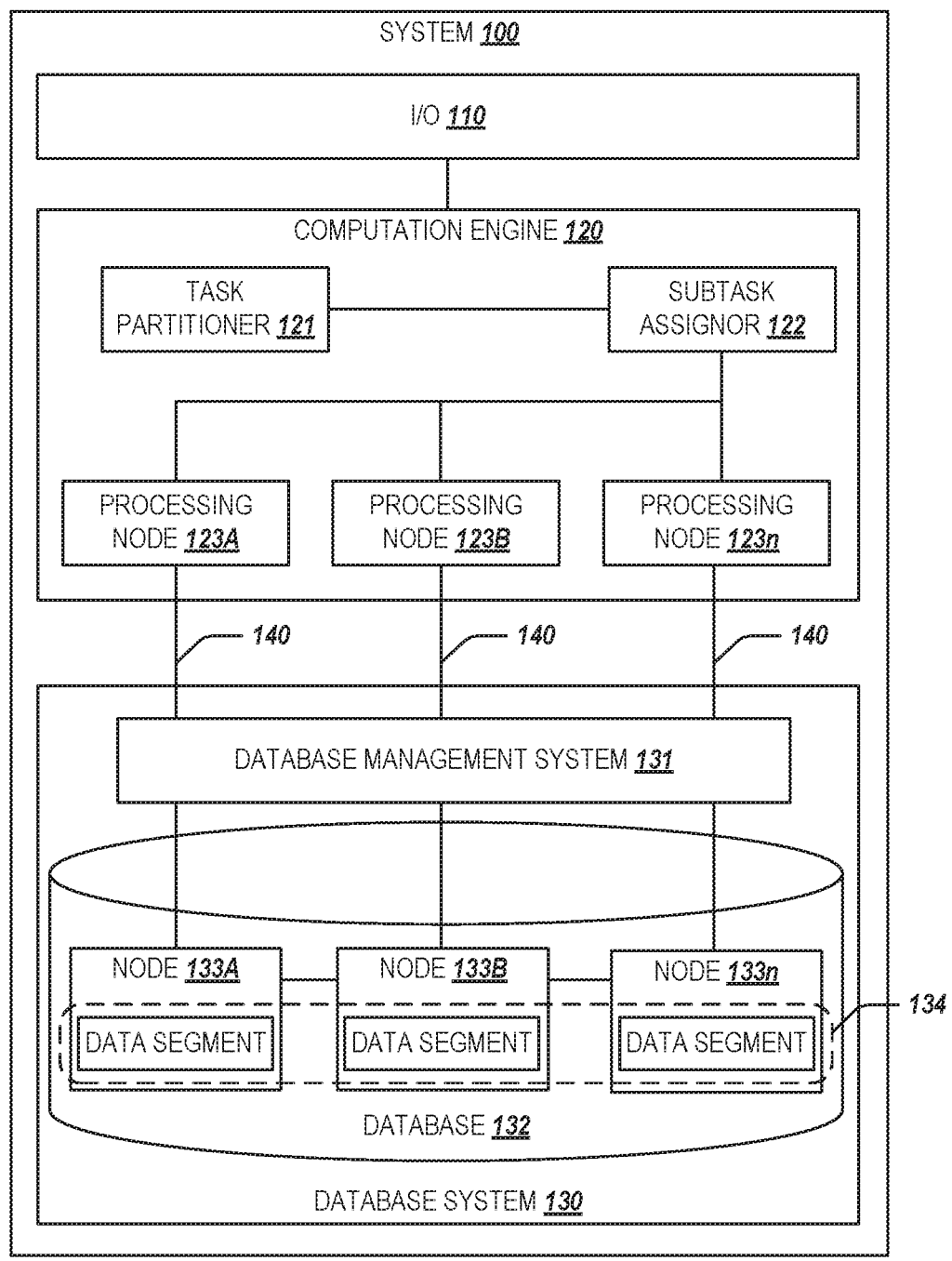
FIG. 1 is a block diagram of an example system for accessing electronic databases.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Database systems organize and store electronic data. A database system may include a database and a database management system (DBMS). The DBMS may manage the database by, among other things, managing interactions between the database and other systems and users. For example, the DBMS may interface with a computation engine to receive queries for electronic data stored in the database and provide the electronic data to the computation engine in response to the queries.

Some types of computation engines, such as parallel computation engines, are capable of receiving a computation task, breaking the task into smaller subtasks, and distributing the subtasks across processing nodes so that the nodes can process the subtasks in parallel. Processing subtasks in parallel allows the computation task to be performed faster and more efficiently than processing the task serially.

In order to process subtasks, the processing nodes may generate queries to the DBMS to retrieve electronic data stored in the database associated with the subtasks. The DBMS may receive the database queries, retrieve the electronic data from the database, and provide the electronic data to the processing nodes through processing pipelines.

In some situations, electronic data pertaining to a computation task may be spread across a plurality of database nodes in the database. When a processing node of the computation engine connects to a database node and issues a database query for electronic data, the electronic data may be retrieved from other database nodes in addition to the connected database node. In order to provide the electronic data on the other database nodes to satisfy the query, the DBMS may issue instructions to the other database nodes to provide the electronic data stored thereon to the connected database node so that the electronic data may be provided to the processing node. This phenomenon may be referred to as data shuffling.

Data shuffling between database nodes may result in increased query processing times due to the need to retrieve electronic data from multiple database nodes. As the number of parallel connections between processing nodes and database nodes increases, the database nodes become the bottleneck of the entire computation task due to data shuffling between database nodes.

Examples disclosed herein describe technical solutions to these technical challenges by providing systems, methods, and computer-readable media for accessing electronic databases. The computation engine may generate queries for electronic data stored in the DBMS and may use the generated queries to push down computation commands to the DBMS. The DBMS may retrieve the electronic data from the database, pre-process the electronic data according to the computation commands, and provide the pre-processed data to the computation engine. Accordingly, the amount of electronic data transferred between database systems and computation engines can be reduced by taking advantage of the DBMS computation capabilities to pre-process the electronic data, resulting in a reduction in the amount of data transferred between database systems and computation engines, an increase in the throughput on the processing pipelines between database systems and computation engines, and faster computation task processing.

Moreover, data shuffling between database nodes can be reduced by utilizing a data locality-aware approach. In some examples, processing nodes of the computation engine may generate queries including requests for electronic data stored on the database nodes to which the processing nodes connect. Electronic data may therefore be retrieved locally from the database nodes as opposed to shuffling data between database nodes to fulfill database queries.

FIG. 1 is a block diagram of an example system 100 for accessing electronic databases. System 100 may be implemented by a single computing system or a plurality of computing systems. A computing system, as used herein, may be any type of computing system including, but not being limited to: a laptop, a desktop, an all-in-one device, a thin client, a workstation, a tablet computer, a mobile device, a network-enabled appliance (e.g., a "Smart" television), an Internet of Things (IoT) sensor, a server device, and a storage device.

As shown in FIG. 1, system 100 may include a number of components such as an input/output (I/O) 110, a computation engine 120, and a database system 130. The number and arrangement of these components is an example only and provided for purposes of illustration. Other arrangements and numbers of components may be utilized without departing from the examples of the present disclosure.

In some examples, computation engine 120 and database system 130 may be implemented as standalone computing systems or may be implemented as a combination of electronic circuitry (i.e., hardware) and software/firmware included in the computing system of system 100 that implements the functionality of computation engine 120 and database system 130. For example, computation engine 120 and database system 130 may be implemented partially or fully in a central processing unit (CPU), in a dedicated integrated circuit such as an ASIC (application-specific integrated circuit), or in a dedicated FPGA (field-programmable gate array) of system 100 that executes instructions (e.g., stored on a machine-readable storage medium of system 100) to offer the functionality of computation engine 120 and database system 130.

I/O 110 may receive computation tasks and provide the received computation tasks to computation engine 120. In some examples, I/O 110 may be implemented as an I/O device that provides users with the capability to provide computation tasks as input to the I/O device. Examples of I/O devices may include physical keyboards, virtual touchscreen keyboards, mice, joysticks, styluses, etc. In some examples, I/O 110 may be implemented as a communications interface (e.g., USB, IEEE 1394, DisplayPort, DVI, HDMI, VGA, Serial port; optical communications interfaces, etc.). In some examples, I/O 110 may be implemented as a wired or wireless networking interface (e.g., Ethernet; Bluetooth, Near Field Communication, etc.). In such examples, the computation tasks may be received at I/O 110 via a network (not shown) such as the Internet; an intranet, a PAN (Personal Area Network), a LAN (Local Area Network), a WAN (Wide Area Network), a SAN (Storage Area Network); a MAN (Metropolitan Area Network); a wireless network, a cellular communications network, a Public Switched Telephone Network, and/or any other type of network(s).

Computation tasks may include Apache® Spark™ jobs, Apache® Hadoop™ jobs, and other cluster computing jobs. A "job" as used herein may refer to a collection of operations to be performed on an electronic dataset. Operations may include transformations, actions, and user-defined instructions.

Transformations may create a new electronic dataset from a source electronic dataset. Examples of transformations include map( ), filter( ) sample( ), aggregation( ) projection( ), and join( ). The map( ) transformation may create a new electronic dataset by passing each element of a source electronic dataset through a function. The filter( ) transformation may create a new electronic dataset that includes elements from the source electronic dataset that meet specified criteria. The sample( ) transformation may create a new electronic dataset from a segment of the source electronic dataset. The aggregation( ) transformation may create a new electronic dataset by aggregating elements in the source electronic dataset based on specified criteria. The projection( ) transformation may create a new electronic dataset that includes an optimized collection of table columns from a source electronic dataset. The join( ) transformation may create a new electronic dataset by joining two or more source electronic datasets.

Actions may return a result after running a computation on an electronic dataset. Examples of actions include reduce( ), collect( ), and count( ). The reduce( ) action combines elements in an electronic dataset and returns the resulting value. The collect( ) action returns all of the elements in an electronic dataset as an array. The count( ) action returns the number of elements in an electronic dataset.

User-defined instructions may include instructions defined by users and provided to computation engine 120 via I/O 110. For example, users may provide instructions to create user-defined database views of data included in a database.

Computation engine 120 may be a parallel computation engine capable of executing computation task operations on segments of an electronic dataset in parallel. Computation engine 120 may be an Apache® Spark™ cluster, an Apache® Hadoop™ cluster, a High-Performance Computing Cluster (HPCC), a Cluster Map Reduce (CMR) cluster, or another cluster computing framework. Computation engine 120 may include a task partitioner 121, a subtask assignor 122, and processing nodes 123A-123n. Each of these components may be implemented as hardware, software, or some combination of hardware and software/firmware as described above regarding computation engine 120 generally.

Task partitioner 121 may partition computation tasks received at I/O 110. The computation tasks may be partitioned into subtasks that can be executed by processing nodes 123A-123n. Subtasks may be created to execute on segments of an electronic dataset. In some examples, task partitioner 121 may partition computation tasks into subtasks at the operation level. In other words, task partitioner 121 may partition operations into subtasks such that each subtask performs the operation on its respective segment of an electronic dataset. For example, a computation task may include a filter( ) operation. In the example, task partitioner 121 may partition the filter( ) operation into subtasks of filter( ) operations that are to be executed on segments of the electronic dataset.

Task partitioner 121 may partition a computation task into subtasks based on various factors. Example factors include computation task size (i.e., the number of operations to be performed on the source electronic dataset), the types of operations to be performed on the source electronic dataset, the size of the source electronic dataset, and the number of database nodes 123A-123n included in computation engine 120.

Subtask assignor 122 may assign subtasks to processing nodes 123A-123n. The subtasks may be assigned based on various factors. Example factors may include the availability of processing nodes, the workloads on each processing node, etc. For examples, subtask assignor 122 may assign a subtask to processing node 123A if processing node 123A has the lowest workload among processing nodes 123A-123n. As another example, subtask assignor 122 may assign a subtask to processing node 123A if processing nodes 123B-123n are not available to process new subtasks.

Processing nodes 123A-123n may execute subtasks assigned by subtask assignor 122. Executing a subtask may include generating queries to a database system (e.g., database system 130) for retrieving electronic data segments of a source electronic dataset so that the operations included in the assigned subtask can be performed on the retrieved electronic data segment. Processing nodes 123A-123n may provide the generated queries to database system 130 via connection 140. While processing nodes 123A-123n are shown in FIG. 1 as being included in computation engine 120, processing nodes 123A-123n may be implemented as standalone systems (e.g., computing systems) for executing the functions described herein with respect to processing nodes 123A-123n.

Database system 130 may include a database management system (DBMS) 131 and a database 132. DBMS 131 may be implemented as hardware, software, or some combination of hardware and software/firmware as described above regarding database system 130 generally. Database 132 may be implemented by any database capable of storing data and may be accessed using methods such as data entry, data transfer, data uploading, etc. In some examples, database 132 may be implemented as a relational database, a parallel database (or massively parallel database), a distributed database, a centralized database, a column-oriented database, or a combination thereof.

Database 132 may store segments of an electronic dataset (e.g., dataset 134) across a plurality of database nodes 133A-133n. Database nodes 133A-133n may provide the electronic data segments stored thereon to processing nodes 123A-123n in response to database queries. Database nodes 133A-133n may provide the data segments to DBMS 131, which in turn provides the data segments to processing nodes 123A-123n via connection 140. Database nodes 133A-133n may be implemented by a single database system or each of database nodes 133A-133n may be implemented as a standalone database communicatively coupled via a communications interface and/or network.

Connection 140 may connect the processing pipelines of processing nodes 123A-123n to the processing pipelines of database nodes 133A-133n (via DBMS 131). Connection 140 may be implemented as an application programming interface (API) that allows computation engine 120 to access database system 130. Example API's include a Java Database Connectivity (JDBC) connector and an Open Database Connectivity (ODBC) connector.

DBMS 131 may receive database queries from processing nodes 123A-123n and may execute the received database queries. To execute a received database query, DBMS 131 may examine the database query to determine the electronic data segment(s) associated with the database query (i.e., the data segment(s) specified in the query to be retrieved). DBMS 131 may identify the database node(s) among database nodes 133A-133n on which the determined electronic data segment(s) is stored. In response to determining the electronic data segment(s) and identifying the database node(s), DBMS 131 may establish a connection with the database node(s), retrieve the electronic data segment(s), and provide the retrieved electronic data segment(s) to the requesting processing node via processing pipelines connected via connection 140 to execute the database query.

In some examples, DBMS 131 may be capable of pre-processing retrieved electronic data segments before providing the retrieved electronic data segments to processing nodes 123A-123n. Pre-processing electronic data segments may reduce the amount of data transferred between database system 130 and computation engine 120, thereby optimizing the utilization of processing pipelines of processing nodes 123A-123n and database nodes 133A-133n and increasing the throughput of system 100. Moreover, pre-processing electronic data segments may allow computation engine 120 to process computation tasks faster because processing nodes 123A-123n may execute operations on smaller data electronic segments.

Pre-processing electronic data segments may include performing computation task operations within database system 130. Processing nodes 123A-123n may push down computation task operations to DBMS 131 via the generated database queries. Computation engine 120 may receive computation tasks via I/O 110 in a programming language that is not understandable by database system 130. For example, computation engine 120 may receive computation tasks in a Scala programming language yet database system 130 may receive instructions in a database query programming language such as Structured Query Language (SQL) programming language. Accordingly, processing nodes 123A-123n may convert computation task operations from the computation engine programming language to the database system programming language. Processing nodes 123A-123n may include the converted operations as pre-processing instructions in the generated database queries and provide the generated queries to DBMS 131 via processing pipelines on connection 140.

As an example of the above, computation engine 120 may receive a computation task that includes a filter( ) operation in Scala. Computation engine 120 may partition (via task partitioner 121) the filter( ) operation into filter( ) operation subtasks and assign (via task assignor 122) the subtasks to processing nodes 123A-123n. Processing nodes 123A-123n may generate database queries to DBMS 131 based on the assigned subtasks. A generated database query may include an identification of the electronic data segment associated with the subtask, an identification of the database node storing the electronic data segment, instructions to retrieve the electronic data segment, and pre-processing instructions for DBMS 131 to perform a filter( ) operation on the electronic data segment before providing the retrieved electronic data segment to the processing node that provided the generated database query. The pre-processing instructions may include the filter( ) operation converted from Scala to SQL such that DBMS 131 may understand and execute the pre-processing instructions.

In some examples, processing nodes 123A-123n may be assigned subtasks that include performing an operation on a portion of electronic data included in electronic dataset 134 that spans a plurality of electronic data segments (e.g., electronic data segments stored on database nodes 133A and 133B). One technique of retrieving electronic data segments stored on a plurality of database nodes includes establishing a connection between a processing node and a database node and retrieving both electronic data segments stored on the database nodes via the connection. For examples processing node 123A may establish a connection with database node 133A (via DBMS 131) and may generate a database query to retrieve both electronic data segments stored on database node 133A and 133B via the connection. In order to retrieve the electronic data segment stored on database node 133B, a connection between database node 133A and 133B is established so that database node 133B may provide its electronic data segment to database node 133A. Database node 133A may then provide both electronic data segments to processing node 123A to execute the database query.

This technique results in data shuffling between database nodes 133A and 133B, which increases system 100 latency due to bottlenecking at database node 133A. Bottlenecking occurs because the connection between processing node 123A and database node 133A is maintained while the connection between database node 133A and 133B is established and the electronic data segment stored on database node 133B is provided to database node 133A. Accordingly, other processing nodes (e.g., processing nodes 123B-123n) that need to retrieve the electronic data segment stored on database node 133A have to wait until the entire transaction between processing node 123A and database node 133A is completed before they can connect to database node 133A.

To alleviate bottlenecking at database nodes 133A-133n, processing nodes 123A-123n may generate database queries such that the generated database queries retrieve electronic data segments stored locally on the database nodes 133A-133n to which the processing nodes 123A-123n connect via connection 140. To achieve this, processing nodes 123A-123n may generate separate database queries to retrieve electronic data segments stored locally on database nodes 133A-133n. Processing node 123A-123n may then establish connections 140 with each database node (via the processing pipelines of processing nodes 123A-123n and database nodes 133A-133n) to obtain the local electronic data segments.

In order to ensure that generated database queries retrieve local electronic data segments, processing nodes 123A-123n may obtain metadata associated with database 132 and generate database queries based on the metadata. The metadata may include, for example, identifiers (e.g., Internet Protocol (IP) addresses) associated with the database nodes storing electronic data segments corresponding to assigned subtasks and hash values for boundaries of the database nodes storing the electronic data segments corresponding to the assigned subtasks.

Processing nodes 123A-123n may obtain the metadata in response to computation tasks being partitioned into subtasks and the subtasks being assigned to processing nodes 123A-123n. Processing nodes 123A-123n may generate database queries based on the obtained metadata by using the metadata to identify database nodes storing electronic data segments corresponding to subtasks assigned to processing nodes 123A-123n. For example, processing nodes 123A-123n may use the hash values of database nodes to identify database nodes storing electronic data segments corresponding to the subtasks. Based on the identified database nodes, processing nodes 123A-123n may determine the number of database queries that need to be generated. For example, a processing node may determine, based on the hash values of the identified database nodes, that three database nodes store electronic data segments corresponding to the subtask assigned to the processing node. The processing node may therefore generate three separate database queries to the three database nodes to retrieve the electronic data segments stored thereon. Processing nodes 123A-123n may include the identifiers (i.e., IP addresses) of the database nodes in the generated database queries so that DBMS 131 can locate the database nodes and retrieve the electronic data segments stored thereon.

Figure 2:
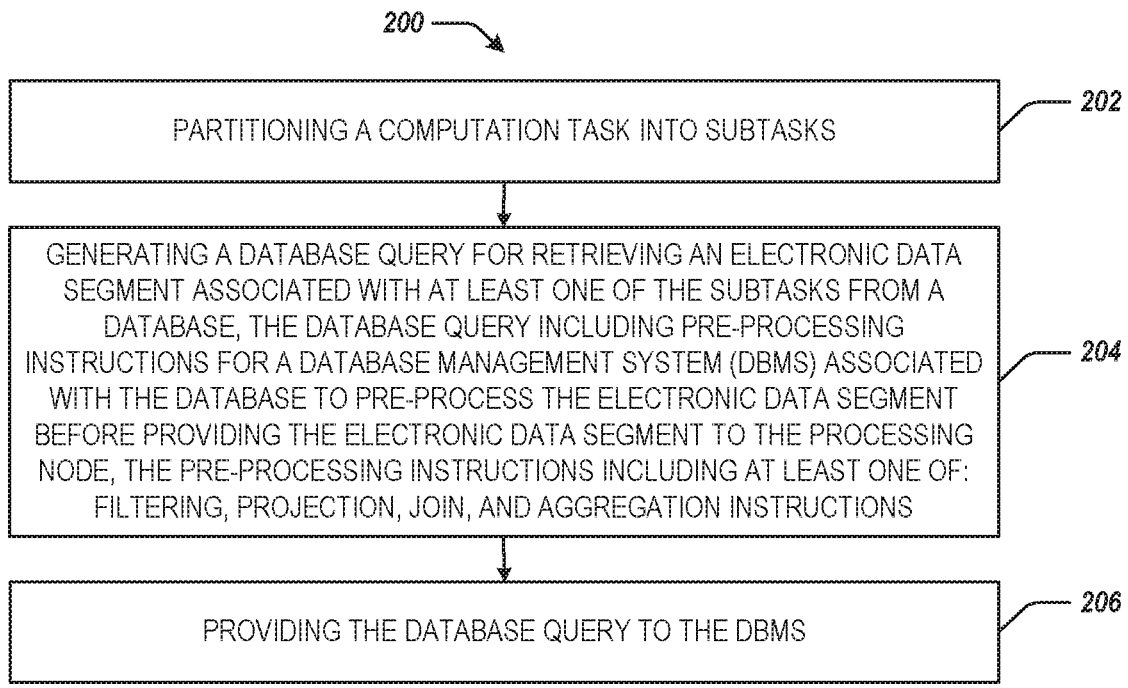
FIG. 2 is a flowchart of an example method for accessing electronic databases.

FIG. 2 is a flowchart depicting an example method 200 for accessing electronic databases. Method 200 may be executed or performed, for example, by some or all of the system components described above in system 100 of FIG. 1. Other suitable computing systems may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In some examples, steps of method 200 may be executed substantially concurrently or in a different order than shown in FIG. 2. In some examples, method 200 may include more or less steps than are shown in FIG. 2. In some examples, some of the steps of method 200 may, at certain times, be ongoing and/or may repeat.

At block 202, method 200 may include partitioning a computation task into subtasks. Referring back to FIG. 1, task partitioner 121 of computation engine 120 may be responsible for implementing block 202.

At block 204, method 200 may include generating, by a processing node of a computation engine, a database query for retrieving an electronic data segment associated with at least one of the subtasks from a database. The database query may include pre-processing instructions for a database management system (DBMS) associated with the database to pre-process the electronic data segment before providing the electronic data segment to the processing node. The pre-processing instructions may include at least one of: filtering, projection, join, aggregation, count, and user-defined instructions. Referring back to FIG. 1, at least one of processing nodes 123A-123n of computation engine 120 may be responsible for implementing block 204.

At block 206, method 200 may include g providing the database query to the DBMS. Referring back to FIG. 1, at least one of processing nodes 123A-123n of computation engine 120 may be responsible for implementing block 206.

Figure 3:
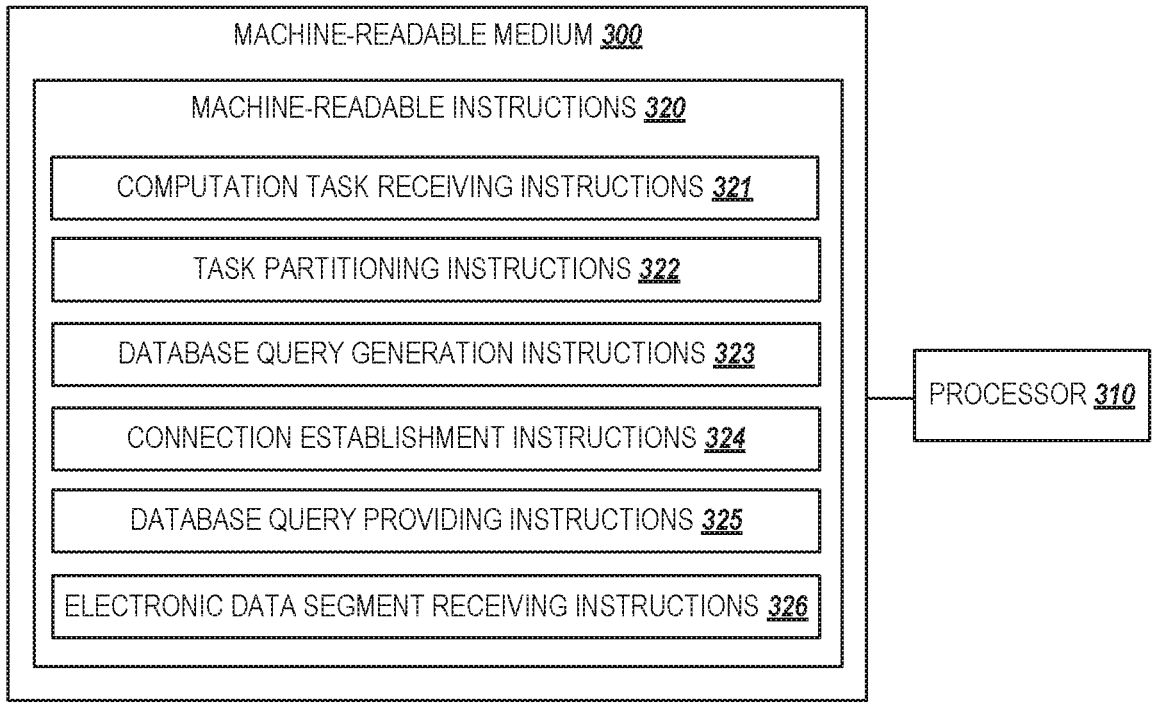
FIG. 3 is a block diagram of an example machine-readable medium for accessing electronic databases.

FIG. 3 is a block diagram of an example machine-readable medium 300 for accessing electronic databases. Machine-readable medium 300 may be communicatively coupled to a processor 310. Machine-readable medium 300 and processor 310 may, for example, be included as part of system 100 illustrated in FIG. 1. Although the following descriptions refer to a single processor and a single machine-readable storage medium, the descriptions may also apply to a system with multiple processors and/or multiple machine-readable storage mediums. In such examples, the instructions may be distributed (e.g., stored) across multiple machine-readable storage mediums and the instructions may be distributed (e.g., executed by) across multiple processors.

Processor 310 may be central processing units (CPUs), microprocessors, and/or other hardware devices suitable for retrieval and execution of instructions stored in machine-readable storage medium 300. In the example shown in FIG. 3, processor 310 may fetch, decode, and execute machine-readable instructions 320 (including instructions 321-326) for accessing electronic databases. As an alternative or in addition to retrieving and executing instructions, processor 310 may include electronic circuits comprising a number of electronic components for performing the functionality of the instructions in machine-readable storage medium 300. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 300 may be any electronic, magnetic, optical, or other physical storage device that stores executable instructions. Thus, machine-readable storage medium 300 may be, for example, Random Access Memory (RAM), a nonvolatile RAM (NVRAM) (e.g., RRAM, PCRAM, MRAM, etc.), an Electrically-Erasable Programmable Read-Only Memory (EEPROM), a flash memory, a storage drive, an optical disc, and the like. Machine-readable storage medium 300 may be disposed within a system (e.g., system 100 of FIG. 1). In this situation, the executable instructions may be "installed" on the system. Alternatively, machine-readable storage medium 300 may be a portable, external or remote storage medium, for example, that allows a system to download the instructions from the portable/external/remote storage medium. In this situation, the executable instructions may be part of an "installation package". As described herein, machine-readable storage medium 300 may be encoded with executable instructions for accessing electronic databases.

Referring to FIG. 3, computation task receiving instructions 321, when executed by a processor (e.g., 310), may cause the processor to receive a computation task. Task partitioning instructions 322, when executed by a processor (e.g., 310), may cause the processor to partition the computation task into subtasks. Database query generation instructions 323, when executed by a processor (e.g., 310), may cause the processor to generate, by a processing node of a computation engine, a database query for retrieving an electronic data segment associated with at least one of the subtasks from a database. The database query may include pre-processing instructions for a database management system (DBMS) associated with the database to pre-process the electronic data segment. The pre-processing instructions may include filtering instructions. Connection establishment instructions 324, when executed by a processor (e.g., 310), may cause the processor to establish, via the DBMS, a connection between the processing node and a database node in the database. The database node may locally store the electronic data segment associated with the at least one of the subtasks. Database query providing instructions 325, when executed by a processor (e.g., 310), may cause the processor to provide the database query to the DBMS. Electronic data receiving instructions 326, when executed by a processor (e.g., 310), may cause the processor to receive, from the database node via the DBMS, the electronic data segment associated with the at least one of the subtasks, the electronic data segment being pre-processed according to the pre-processing instructions.

Figure 4:
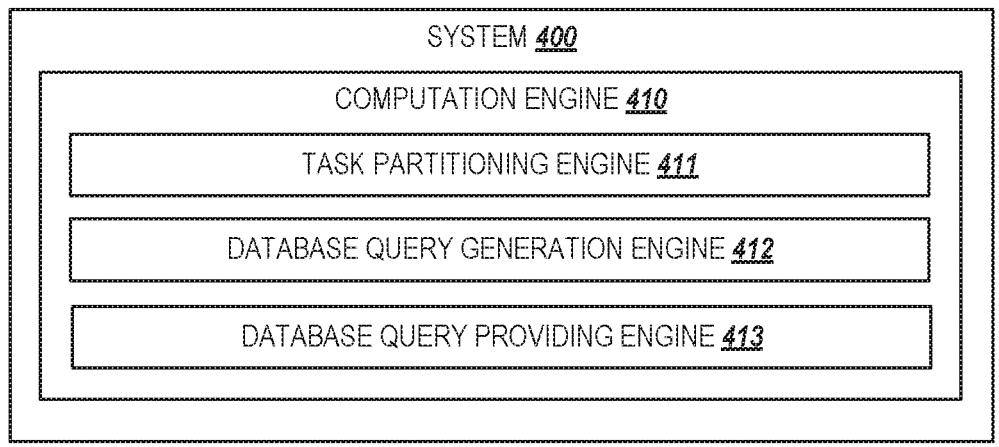
FIG. 4 is a block diagram of an example system for accessing electronic databases.

FIG. 4 is a block diagram depicting an example system 400 including a computation engine 410. Computation engine 410 may include a task partitioning engine 411, a database query generation engine 412, and a database query providing engine 413. The term "engine", as used herein, refers to a combination of hardware and programming that performs a designated function. For example, the hardware of each engine may include one or both of a processor and a machine-readable storage medium, while the programming is instructions or code stored on the machine-readable storage medium and executable by the processor to perform the designated function.

Referring to FIG. 4, task partitioning engine 411 may include a processor and program instructions that, when executed, cause the processor to partition a computation task into subtasks. Database query generation engine 412 may include a processor and program instructions that, when executed, cause the processor to generate, by processing nodes of the computation engine, database queries for retrieving electronic data segments associated with the subtasks from a database. The database queries may include pre-processing instructions for a database management system (DBMS) associated with the database to pre-process the electronic data segments. The pre-processing instructions may include at least one of count and user-defined instructions. Database query providing engine 413 may include a processor and program instructions that, when executed, cause the processor to provide, by the processing nodes, the database queries to the DBMS in parallel.

Figure 5:
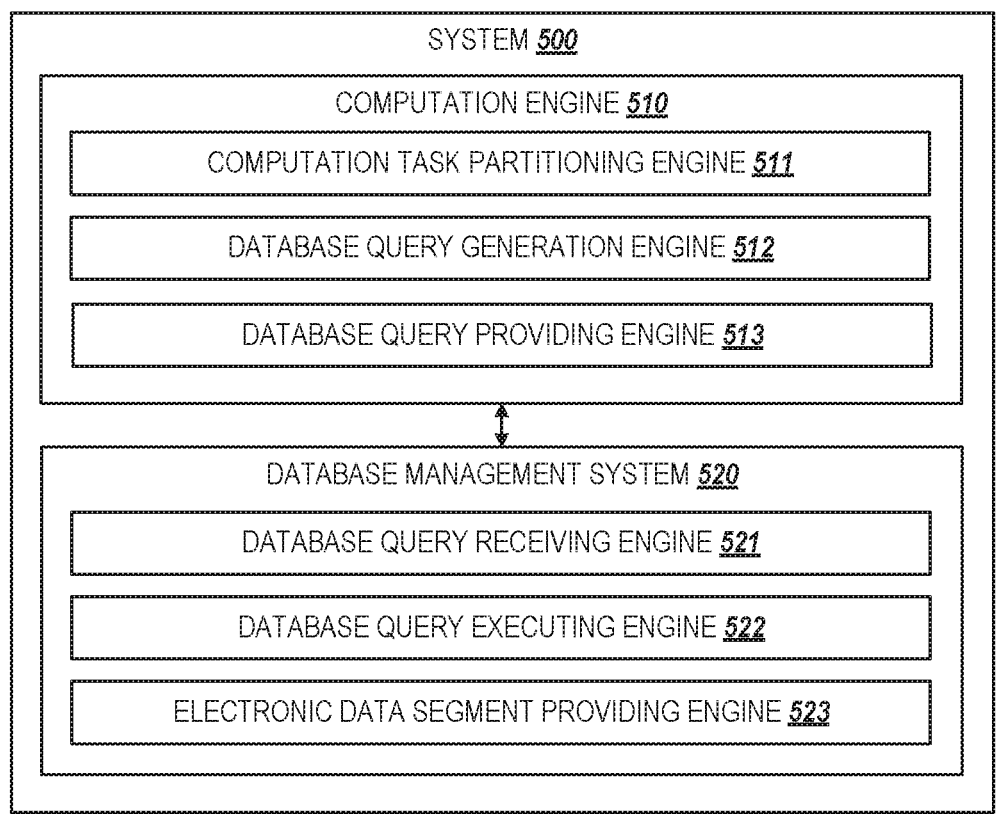
FIG. 5 is a block diagram of an example system for accessing electronic databases.

FIG. 5 is a block diagram depicting an example system 500 including a computation engine 510 and a database management system (DBMS) 520. Computation engine 510 may include a task partitioning engine 511, a database query generation engine 512, and a database query providing engine 513. DBMS 520 may include a database query receiving engine 521, database query executing engine 522, and an electronic database providing engine 523. The term "engine", as used herein, refers to a combination of hardware and programming that performs a designated function. For example, the hardware of each engine may include one or both of a processor and a machine-readable storage medium, while the programming is instructions or code stored on the machine-readable storage medium and executable by the processor to perform the designated function.

Referring to FIG. 5, task partitioning engine 511 may include a processor and program instructions that, when executed, cause the processor to partition a computation task into subtasks. Database query generation engine 512 may include a processor and program instructions that, when executed, cause the processor to generate, by processing nodes of the computation engine, database queries for retrieving electronic data segments associated with the subtasks from a database. The database queries may include pre-processing instructions for a database management system (DBMS) associated with the database to pre-process the electronic data segments. The pre-processing instructions may include at least one of count and user-defined instructions. Database query providing engine 513 may include a processor and program instructions that, when executed, cause the processor to provide, by the processing nodes, the database queries to the DBMS in parallel.

Database query receiving engine 521 may include a processor and program instructions that, when executed, cause the processor to receive the database queries from the processing nodes. Database query executing engine 522 may include a processor and program instructions that, when executed, cause the processor to execute the database queries by retrieving the electronic data segments associated with the subtasks and pre-processing the electronic data segments according to the pre-processing instructions. Electronic data segment providing engine 523 may include a processor and program instructions that, when executed, cause the processor to provide the pre-processed electronic data segments to the processing nodes via a connection between processing pipelines of the processing nodes and database nodes.

The foregoing disclosure describes a number of example implementations for accessing electronic databases. The disclosed examples may include systems, devices, computer-readable storage media, and methods for accessing electronic databases. For purposes of explanation, certain examples are described with reference to the components illustrated in FIGS. 1-5. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 2 is an example and not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for accessing electronic databases, the method comprising:
 partitioning, by a processor of a computation engine, a computation task into a plurality of subtasks to be processed by a plurality of processing nodes of the computation engine;
 generating, by each processing node of the plurality of processing nodes that are to process a subtask of the plurality of subtasks, a database query for retrieving an electronic data segment associated with the subtask from a database node of a plurality of database nodes of a database system, wherein the database query generated by each processing node of the plurality of processing nodes includes instructions that instruct a database management system (DBMS) associated with the database system to:
  retrieve the electronic data segment from the database node,
  perform a specific pre-processing operation, including one of a filtering operation, a projection operation, a join operation, an aggregation operation, or a count operation, on the retrieved electronic data segment and
  after performing the specific pre-processing operation on the retrieved electronic data segment, transmit the retrieved electronic data segment to the processing node that generated the database query; and
 transmitting, by each processing node of the plurality of processing nodes, the generated database query to the DBMS via a connection.

2. The method of claim 1, wherein the instructions in the database query include user-defined instructions.

3. The method of claim 1, wherein the instructions in the database query are implemented using Structured Query Language (SQL) programming commands.

4. The method of claim 1, wherein transmitting the generated database query to the DBMS includes:
 transmitting, by each of the plurality of the processing nodes, the generated database query to the DBMS via processing pipelines.

5. The method of claim 4, wherein the processing pipelines are connected via an application programming interface (API).

6. The method of claim 1, further comprising:
 obtaining, from the DBMS, metadata associated with the database system, wherein the metadata includes an Internet Protocol (IP) address of the database node storing the electronic data segment and
 causing each processing node of the plurality of processing nodes to generate the database query based on the metadata.

7. A system, comprising:
 a processor to:
  receive a computation task; and
  partition the computation task into a plurality of subtasks to be processed by a plurality of processing nodes of a computation engine; and
 the plurality of processing nodes that are to process the plurality of subtasks to:
  generate database queries for retrieving electronic data segments associated with respective ones of the plurality of subtasks from a plurality of database nodes of a database system,
   wherein each database query of the database queries generated by one processing node of the plurality of processing nodes includes instructions that instruct a database management system (DBMS) associated with the database system to:
    retrieve an electronic data segment of the electronic data segments from a database node of the plurality of database nodes,
    perform a specific pre-processing operation, including one of a filtering operation, a projection operation, a join operation, an aggregation operation, or a count operation, on the retrieved electronic data segment; and
    after performing the specific pre-processing operation on the retrieved electronic data segment, transmit the retrieved electronic data segment to the processing node that generated the database query; and
  provide the generated database queries to the DBMS via connections in parallel.

8. The system of claim 7, further comprising:
 the DBMS, wherein the DBMS is to:
  receive the database queries from the plurality of processing nodes;
  retrieve the electronic data segments associated with the plurality of subtasks from the plurality of database nodes;
  perform the specific pre-processing operation on the retrieved electronic data segments according to the instructions in the database queries; and
  after performing the specific pre-processing operation on the electronic data segments, transmit the retrieved electronic data segments to the plurality of processing nodes via processing pipelines of the plurality of processing nodes in the computation engine and processing pipelines of the plurality of database nodes in the database system.

9. The system of claim 8, wherein:
 the computation engine is to establish connections between the processing pipelines of the plurality of processing nodes and the processing pipelines of the plurality of database nodes; and
 the DBMS is to transmit the retrieved electronic data segments from each of the plurality of database nodes to an associated one of the plurality of processing nodes via the established connections.

10. The system of claim 9, wherein, after partitioning the computation task into the plurality of subtasks, the processor assigns the plurality of subtasks to each processing node of the plurality of processing nodes.

11. The system of claim 7, wherein, after partitioning the computation task into the plurality of subtasks, the processor:
 obtains, from the DBMS, metadata associated with the database system, wherein the metadata includes Internet Protocol (IP) addresses of the plurality of database nodes storing the electronic data segments corresponding to the computation task; and causes the plurality of processing nodes to generate the database queries based on the metadata.

12. The system of claim 7, wherein the database queries for retrieving the electronic data segments from the plurality of database nodes include instructions to retrieve the electronic data segments stored entirely on a single database node among the plurality of database nodes.

13. The system of claim 7, wherein the instructions in each database query of the database queries are implemented using a database query programming language.

14. The system of claim 7, wherein the computation engine receives the computation task via a Java Database Connectivity (JDBC) connector or an Open Database Connectivity (ODBC) connector.

15. A non-transitory machine-readable storage medium storing instructions that, when executed by a processor, cause the processor to:

partition a computation task into a plurality of subtasks to be processed by a plurality of processing nodes of a computation engine;

assign the plurality of subtasks to the plurality of processing nodes; and cause each processing node of the plurality of processing nodes that process a subtask of the plurality of subtasks to:

generate a database query for retrieving an electronic data segment associated with the subtask from a database node of a plurality of database nodes of a database system, wherein the database query generated by the processing node includes instructions that instruct a database management system (DBMS) associated with the database system to:

retrieve the electronic data segment from the database node, perform a specific pre-processing operation, including one of a filtering operation, a projection operation, a join operation, an aggregation operation, or a count operation, on the retrieved electronic data segment, and after performing the specific pre-processing operation on the retrieved electronic data segment, transmit the retrieved electronic data segment to the processing node that generated the database query;

transmit the database query to the DBMS via a connection; and receive, from the DBMS, the retrieved electronic data segment associated with the subtask, wherein the specific pre-processing operation in the database query was performed on the retrieved electronic data segment by the DBMS.

16. The non-transitory machine-readable storage medium of claim 15, wherein the instructions, when executed by the processor, cause the processor to:

obtain, from the DBMS, metadata associated with the database system in response to partitioning the computation task into the plurality of subtasks; and cause each processing node of the plurality of processing nodes to generate the database query based on the metadata.

17. The non-transitory machine-readable storage medium of claim 16, wherein the metadata includes hash values for boundaries of the plurality of database nodes storing electronic data segments corresponding to the subtasks.

18. The non-transitory machine-readable storage medium of claim 16, wherein the metadata includes Internet Protocol (IP) addresses of the plurality of database nodes storing electronic data segments corresponding to the computation task.

19. The non-transitory machine-readable storage medium of claim 15, wherein the connection is implemented as a Java database connectivity (JDBC) connection.

20. The non-transitory machine-readable storage medium of claim 15, wherein the instructions in the database query include user-defined instructions.

* * * * *